(12) United States Patent
Sato et al.

(10) Patent No.: US 8,969,432 B2
(45) Date of Patent: Mar. 3, 2015

(54) MODIFIED POLYTETRAFLUOROETHYLENE PARTICLES, METHOD FOR PRODUCING THE SAME, AND MODIFIED POLYTETRAFLUOROETHYLENE MOLDED PRODUCT

(75) Inventors: Hiroyuki Sato, Settsu (JP); Yasuhiko Sawada, Settsu (JP); Shunji Kasai, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 297 days.

(21) Appl. No.: 13/350,265

(22) Filed: Jan. 13, 2012

(65) Prior Publication Data

US 2012/0184665 A1    Jul. 19, 2012

(30) Foreign Application Priority Data

Jan. 17, 2011   (JP) ................. 2011-007309

(51) Int. Cl.
```
C08F 259/08       (2006.01)
C08F 214/26       (2006.01)
C08F 14/26        (2006.01)
C08J 3/12         (2006.01)
C08L 27/18        (2006.01)
C08F 2/26         (2006.01)
```
(52) U.S. Cl.
CPC ............. *C08F 214/26* (2013.01); *C08F 259/08* (2013.01); *C08F 14/26* (2013.01); *C08J 3/126* (2013.01); *C08L 27/18* (2013.01); *C08F 2/26* (2013.01); *C08J 2327/18* (2013.01); *C08J 2427/18* (2013.01); *C08L 2205/02* (2013.01)
USPC .......................................... 523/201; 525/276

(58) Field of Classification Search
CPC .................................... C08F 259/08

USPC .......................................... 523/201; 525/276
See application file for complete search history.

(56) References Cited

U.S. PATENT DOCUMENTS

| | | | |
|---|---|---|---|
| 3,350,373 A | | 10/1967 | Sianesi et al. |
| 4,636,549 A | * | 1/1987 | Gangal et al. ............... 524/546 |
| 4,904,726 A | * | 2/1990 | Morgan et al. ............... 524/520 |
| 7,754,795 B2 | * | 7/2010 | Hintzer et al. ............... 524/284 |
| 8,263,719 B2 | * | 9/2012 | Sabol et al. ............... 526/250 |
| 2004/0236047 A1 | * | 11/2004 | Ono et al. ............... 526/247 |
| 2008/0020159 A1 | * | 1/2008 | Taira et al. ............... 428/35.7 |
| 2009/0176934 A1 | * | 7/2009 | Sabol et al. ............... 524/805 |

FOREIGN PATENT DOCUMENTS

| | | |
|---|---|---|
| EP | 0 764 668 A1 | 3/1997 |
| JP | 3616784 B2 | 2/2005 |
| JP | 3764752 B2 | 4/2006 |

* cited by examiner

*Primary Examiner* — Nicole M Buie-Hatcher
(74) *Attorney, Agent, or Firm* — Sughrue Mion, PLLC

(57) ABSTRACT

Provided are modified polytetrafluoroethylene particles having excellent moldability and processability. The modified polytetrafluoroethylene particles each have a core-shell structure that includes a particle core and a particle shell, the particle core having repeating units of tetrafluoroethylene and a comonomer (a), the particle shell having repeating units of tetrafluoroethylene and a comonomer (b), the comonomer (a) being a (perfluoroalkyl)ethylene represented by the following formula (I):

$$CH_2=CH-Rf \qquad (I)$$

wherein Rf represents a C1 to C10 perfluoroalkyl group, the comonomer (b) being at least one monomer selected from the group consisting of 1,1,3,3,3-pentafluoro-1-propylene and 1,2,3,3,3-pentafluoro-1-propylene.

11 Claims, No Drawings

MODIFIED POLYTETRAFLUOROETHYLENE PARTICLES, METHOD FOR PRODUCING THE SAME, AND MODIFIED POLYTETRAFLUOROETHYLENE MOLDED PRODUCT

TECHNICAL FIELD

The present invention relates to modified polytetrafluoroethylene particles, a method of producing the same, and a modified polytetrafluoroethylene molded product. The present invention also relates to a modified polytetrafluoroethylene aqueous dispersion and a modified polytetrafluoroethylene fine powder.

BACKGROUND ART

One known method of increasing the moldability of a polytetrafluoroethylene and the creep resistance and transparency of a molded product thereof is copolymerizing tetrafluoroethylene and a minute amount of comonomers. Such a polytetrafluoroethylene modified by copolymerization with a minute amount of comonomers is used as a coating material for wires and coaxial cables because it has better moldability and processability than a tetrafluoroethylene homopolymer and has excellent electrical properties.

Patent Document 1 teaches as a modified polytetrafluoroethylene a fine powder which is a modified polytetrafluoroethylene fine powder containing copolymerized tetrafluoroethylene, perfluoro(n-butyl)ethylene, and perfluoro(propyl vinyl ether) or hexafluoropropylene, the fine powder having a melt viscosity of $1 \times 10^8$ Pa·s.

Also, Patent Document 2 teaches a method of manufacturing modified polytetrafluoroethylene fine powder by a polymerization reaction comprising copolymerizing tetrafluoroethylene (TFE) with perfluorobutyl ethylene and hexafluoropropylene (HFP) in an aqueous medium in the presence of a fluorine-containing dispersing agent at a temperature in the range of 10-90° C. and under an average pressure in the range of 6-30 kg/cm²G, the copolymerizing being carried out by feeding the TFE to the aqueous medium, feeding the perfluorobutyl ethylene to the aqueous medium in the early stage of the polymerization reaction, feeding the HFP to the aqueous medium after at least 75% of the tetrafluoroethylene to be copolymerized has been consumed in the polymerization reaction, and after completing the polymerization reaction, coagulating the resultant primary grains of modified polytetrafluoroethylene (modified PTFE) and drying the resultant coagulum to obtain the modified PTFE powder, the feeding of the perfluorobutyl ethylene and the HFP being carried out so that the polytetrafluoroethylene powder contains 0.01-0.07 wt % of the perfluorobutyl ethylene and 0.01-0.05 wt % of the HFP, the total amount of the perfluorobutyl ethylene and the HFP present in the polytetrafluoroethylene powder being 0.03-0.08 wt %, based on the weight of TFE in the powder, the average grain size of the primary grains being in the range of 0.1-0.5 μm, the spheroidicity of the primary grains being 1.5 or lower, and the thermal degradation index of the powder being 20 or lower.
Patent Document 1: JP 3764752 B
Patent Document 2: JP 3616784 B

SUMMARY OF THE INVENTION

These conventional modified polytetrafluoroethylenes, however, have been desired for further improvement because of their insufficient moldability and processability.

The present invention aims to provide modified polytetrafluoroethylene particles having excellent moldability and processability.

The present inventors have made various studies and have found that a modified polytetrafluoroethylene having a characteristic core-shell structure shows surprisingly excellent moldability and processability. The modified polytetrafluoroethylene is in the form of particles each having a structure with a particle core and a particle shell which have been copolymerized with respective specific modifiers.

That is, one aspect of the present invention is modified polytetrafluoroethylene particles, each having a core-shell structure that includes a particle core and a particle shell, the particle core having repeating units of tetrafluoroethylene and a comonomer (a), the particle shell having repeating units of tetrafluoroethylene and a comonomer (b), the comonomer (a) being a (perfluoroalkyl)ethylene represented by the following formula (I):

$$CH_2=CH-Rf \qquad (I)$$

wherein Rf represents a C1 to C10 perfluoroalkyl group, the comonomer (b) being at least one monomer selected from the group consisting of 1,1,3,3,3-pentafluoro-1-propylene ($CF_2=CH-CF_3$) and 1,2,3,3,3-pentafluoro-1-propylene ($CFH=CF-CF_3$).

In the modified polytetrafluoroethylene particles of the present invention, the particle cores preferably constitute 75 to 95 wt % of the total amount of the particles, and the particle shells preferably constitute 5 to 25 wt % of the total amount of the particles.

In the modified polytetrafluoroethylene particles of the present invention, the repeating units of the comonomers (b) in the particle shells preferably constitute 0.001 to 0.050 wt % of the total amount of the particles.

In the modified polytetrafluoroethylene particles of the present invention, the repeating units of the comonomers (a) in the particle cores preferably constitute 0.010 to 0.030 wt % of the total amount of the particles.

In the modified polytetrafluoroethylene particles of the present invention, the repeating units of the comonomers (a) and the comonomers (b) together preferably constitute 0.011 to 0.060 wt % of the total amount of the particles.

Each of the comonomers (a) is preferably (perfluorohexyl)ethylene.

The modified polytetrafluoroethylene particles preferably have a standard specific gravity of 2.140 to 2.160.

Another aspect of the present invention is a modified polytetrafluoroethylene aqueous dispersion including the modified polytetrafluoroethylene particles.

Yet another aspect of the present invention is a modified polytetrafluoroethylene fine powder consisting of the modified polytetrafluoroethylene particles.

Yet another aspect of the present invention is a modified polytetrafluoroethylene molded product made of the modified polytetrafluoroethylene particles.

Yet another aspect of the present invention is a method for producing the modified polytetrafluoroethylene particles, comprising the steps of (1) polymerizing tetrafluoroethylene and the comonomer (a), and (2) polymerizing tetrafluoroethylene and the comonomer (b) after step (1).

The modified polytetrafluoroethylene particles of the present invention have the above structure, and therefore have excellent moldability and processability.

MODES FOR CARRYING OUT THE INVENTION

The modified polytetrafluoroethylene [modified PTFE] particles of the present invention each have a core-shell structure consisting of a particle core and a particle shell.

In the modified PTFE particles of the present invention, the particle cores preferably constitute 75 to 95 wt % of the total amount of the particles, and the particle shells preferably constitute 5 to 25 wt % of the total amount of the particles. More preferably, the particle cores constitute 85 to 95 wt % of the total amount of the particles, and the particle shells constitute 5 to 15 wt % of the total amount of the particles.

Too high a ratio of the particle cores to the entire particles tends to result in a decrease in the moldability, leading to deterioration of the appearance of the extruded product. Too low a ratio of the particle cores to the entire particles leads to an increase in the ratio of the particle shells (shells), which may cause a decrease in the extruding pressure to decrease the strength of the extruded product.

The particle core is produced from tetrafluoroethylene [TFE] and a comonomer (a) (a modifying monomer in the core).

The comonomer (a) is a (perfluoroalkyl)ethylene represented by the following formula (I):

$$CH_2=CH-Rf \qquad (I)$$

wherein Rf represents a C1 to C10 perfluoroalkyl group. Rf is preferably a C4 to C10 perfluoroalkyl group, and more preferably a C5 to C8 perfluoroalkyl group. The comonomer (a) is particularly preferably (perfluoro hexyl)ethylene.

Regarding the modified PTFE particles of the present invention, the repeating units of the comonomers (a) in the particle cores preferably constitute 0.010 to 0.030 wt % of the total amount of the particles.

The comonomer (a) in the core enables uniform modification even if the amount thereof is small, and reduces the possibility of a decrease in the electrical properties. Too large an amount of the repeating units of the comonomers (a) may deteriorate the electrical properties or decrease the thermal stability. Too small an amount of the repeating units may lead to non-uniform modification, which may make the particle shapes non-uniform, resulting in a decrease in the moldability (e.g. appearance of the extruded product). The particle core preferably does not include the repeating units of comonomers (b).

The particle shell is produced from tetrafluoroethylene and a comonomer (b) (a modifying monomer in the shell). The comonomer (b) is at least one monomer selected from the group consisting of 1,1,3,3,3-pentafluoro-1-propylene and 1,2,3,3,3-pentafluoro-1-propylene. The modified PTFE particles of the present invention can have significantly excellent moldability and processability because the particle cores each are produced from a (perfluoroalkyl)ethylene represented by the above formula (I) and the particle shells each are produced from the above specified comonomer (b). The significantly excellent moldability and processability can be evaluated based on green elongation of the extruded product made of the modified PTFE particles.

Also, the modified PTFE particles of the present invention having the above structure can contribute to suppression of defects at the time of molding. The modified PTFE particles contribute to a decrease in the extrusion pressure and a decrease in the dielectric loss of the molded product to be obtained, and therefore the molded product has excellent electrical properties. Accordingly, the molded product can be particularly suitably used as a coating material for wires.

With regard to the modified polytetrafluoroethylene particles of the present invention, the repeating units of the comonomers (b) in the particle shells preferably constitute 0.001 to 0.050 wt %, more preferably 0.010 to 0.030 wt %, and still more preferably 0.010 to 0.020 wt %, of the total amount of the particles.

Too large an amount of the repeating units of the comonomers (b) may lead to a decrease in the electrical properties. Also in this case, the extrusion pressure may be excessively decreased to cause molding defects, and the heat resistance may also be decreased. Too small an amount thereof may lead to high extrusion pressure, decreasing the moldability.

The comonomer (b), having a hydrogen atom, may possibly have heat resistance lower than that of perfluoro monomers; still, modified PTFE particles having better heat resistance, high green elongation, and excellent moldability and processability can be produced if the particle shells contain comonomers (b) in an amount within the above appropriate range.

The repeating units of the comonomers (a) and the comonomers (b) together preferably constitute 0.011 to 0.060 wt %, more preferably 0.011 to 0.050 wt %, still more preferably 0.025 to 0.050 wt %, and particularly preferably 0.025 to 0.036 wt %, of the total amount of the particles.

The particle shells are also preferably formed by polymerization in the presence of (with use of) a later-described chain transfer agent. If the particle shells are formed with use of a chain transfer agent, even better moldability can be achieved.

The modified PTFE particles of the present invention cannot be melt-processed just as unmodified tetrafluoroethylene cannot be melt-processed. In this context, the modified PTFE particles of the present invention are distinguished from fluororesins which are melt-processable.

The modified PTFE particles of the present invention preferably have a standard specific gravity [SSG] of 2.140 to 2.160, and more preferably 2.146 to 2.155. Too large a standard specific gravity may lead to a decrease in the heat resistance or cracks at the time of molding. Too small a standard specific gravity may lead to a decrease in the moldability and processability. The standard specific gravity can be measured by water displacement method in accordance with ASTM D4895-89.

For example, the PTFE particles described in JP 3764752 B easily cause cracks when molded into a coating material for wires because the particles have a large SSG and a low molecular weight.

The modified PTFE particles of the present invention preferably have an average primary particle size of 100 to 500 nm. As mentioned later, particles having such a particle size can be produced by emulsion polymerization of tetrafluoroethylene and comonomers, that is, polymerization of tetrafluoroethylene and comonomers in an aqueous dispersion in the presence of a surfactant. The average primary particle size of the modified PTFE particles is more preferably 200 to 300 nm.

The average primary particle size can be determined based on a transmittance of each sample of modified PTFE aqueous dispersion (solid content: 0.15 wt %) having the modified PTFE particles dispersed therein and a working curve showing the correlation between the transmittance and a number average primary particle size of the sample. The transmittance is obtained by placing the aqueous dispersion in a cell and measuring the transmittance of incident light at 550 nm. The number average primary particle size is calculated by measuring diameters in a fixed direction on a transmission electron photomicrograph.

The modified PTFE particles of the present invention preferably have a cylinder extrusion pressure, at a reduction ratio [RR] of 1500, of not higher than 65 MPa, and more preferably not higher than 55 MPa. The cylinder extrusion pressure may be not higher than 40 MPa.

The "cylinder extrusion pressure" herein is the value measured at a reduction ratio of 1500 at the time of extruding a mixture of 100 parts by mass of the modified PTFE particles and 20.5 parts by mass of a hydrocarbon oil (trademark: Isopar G, product of Exxon Chemical Company) as an extrusion aid, at room temperature (25±2° C.; the same applies to the following description).

The modified PTFE particles of the present invention can give a green elongation of not lower than 160%, not lower than 180%, or not lower than 200%, to an extruded product made of the modified PTFE particles. In this way, the modified PTFE particles, produced using the above comonomers (b) as the modifying monomers in the shells, can give an extruded product having excellent green elongation; still, the reason for the increase in the green elongation is not clear.

The green elongation is a value calculated by obtaining an extruded product made of the modified PTFE particles through extrusion at a reduction ratio of 1500, drying the extruded product at a certain temperature, and measuring the distance at which the extruded product is broken in a test using a tensile strength tester.

The modified PTFE particles of the present invention can be suitably produced by a method including the steps of (1) polymerizing tetrafluoroethylene and the comonomer (a), and (2) polymerizing tetrafluoroethylene and the comonomer (b) after step (1). The method of producing the modified PTFE particles is also one aspect of the present invention.

The polymerization is preferably performed in an aqueous medium. The aqueous medium contains water. The aqueous medium may contain an organic solvent having polarity as well as water. Examples of the organic solvent having polarity include nitrogen-containing solvents such as N-methylpyrrolidone [NMP]; ketones such as acetone; esters such as ethyl acetate; polar ethers such as diglyme and tetrahydrofuran [THF]; and carbonates such as diethylene carbonate. Each of these solvents may be used alone or two or more of these may be used in combination.

In step (1), the polymerization of tetrafluoroethylene and the comonomer (a) is preferably performed until at least 75 wt % (more preferably 85 wt %, and still more preferably 90 wt %) of the total amount of tetrafluoroethylene to be used to form modified polytetrafluoroethylene particles is used.

Step (1) usually includes a process of adding tetrafluoroethylene and the comonomer (a) to the reaction system. In step (1), each of tetrafluoroethylene and the comonomer (a) may be added to the reaction system collectively, intermittently, or continuously.

The comonomer (a) is preferably added to the reaction system in an early stage of the reaction, and is more preferably added to the reaction system collectively before the initiation of the reaction in terms of simplification of the production process. The comonomer (a) affects the reaction rate, the average primary particle size of the PTFE particles, and the reactivity of the comonomer (b).

Too large a charging amount of the comonomer (a) may decrease the reaction rate or excessively decrease the average primary particle size of the modified PTFE particles to be obtained. Further, the residues of the comonomer (a) after the polymerization of the particle cores may decrease the reactivity of the comonomer (b) in the polymerization of the particle shells.

The polymerization in step (1) is preferably performed by adding a polymerization initiator to the aqueous medium. Examples of the polymerization initiator include water-soluble organic peroxides such as disuccinic acid peroxide (hereinafter also referred to as "DSP"); and persulfates such as ammonium persulfate (hereinafter also referred to as "APS") and potassium persulfate. Suitable examples of the initiator include inorganic persulfates such as ammonium persulfate, peroxides such as disuccinic acid peroxide, and inorganic permanganates such as potassium permanganate. The initiator may also be a redox initiator. Each of the polymerization initiators may be used alone or two or more of these may be used in combination. Particularly, APS and/or DSP are/is preferable because they also function as chain transfer agents.

The amount of the polymerization initiator used in step (1) is preferably 0.0001 to 0.02 parts by mass for each 100 parts by mass of the aqueous medium. Here, combination use of APS and DSP is also preferable.

Step (2) usually includes a process of adding tetrafluoroethylene and the comonomer (b) to the reaction system. In step (2), tetrafluoroethylene and the comonomer (b) may be added to the reaction system collectively, intermittently, or continuously.

Step (2) is performed after the amount of reacted TFE has reached the amount of TFE required for formation of the particle cores. For example, introduction of the comonomer (b) may be performed by stopping the supply of TFE and stirring upon completion of the polymerization of the particle cores, releasing the monomers remaining in the reaction system, and decreasing the pressure in the reaction system to a value lower than the vapor pressure of the comonomer (b). The comonomer (b) may be introduced into the reaction system without stopping the supply of TFE and stirring.

The polymerization in step (2) is preferably performed with use of a chain transfer agent. Examples of the chain transfer agent include non-peroxide organic compounds (e.g. water-soluble alcohols, hydrocarbons, fluorinated hydrocarbons), water-soluble organic peroxides (e.g. disuccinic acid peroxide [DSP]), persulfates (e.g. ammonium persulfate [APS], potassium persulfate [KPS]), C1 to C4 water-soluble alcohols, C1 to C4 hydrocarbons, and C1 to C4 fluorinated hydrocarbons. Each of these chain transfer agents may be used alone, or two or more of these may be used in combination.

The chain transfer agent is preferably at least one selected from the group consisting of C1 to C4 water-soluble alcohols, C1 to C4 hydrocarbons, C1 to C4 fluorinated hydrocarbons, and persulfates, in terms of good dispersibility and good uniformity in the reaction system. The chain transfer agent is more preferably at least one selected from the group consisting of methane, ethane, n-butane, isobutane, methanol, HFC-134a, HFC-32, DSP, APS, and KPS, and still more preferably at least one selected from the group consisting of methanol and isobutane.

The polymerization in each of step (1) and step (2) is preferably performed in an aqueous medium in the presence of a surfactant.

The surfactant may be any of a nonionic surfactant, an anionic surfactant, a cationic surfactant, and an amphoteric surfactant. Among these, an anionic surfactant or a nonionic surfactant is preferable. The surfactant preferably constitutes 0.08 to 0.2 wt % of the aqueous medium. The average primary particle size of the modified PTFE particles of the present invention can also be adjusted by changing the surfactant concentration in the aqueous medium.

The surfactant is preferably a fluorosurfactant. The fluorosurfactant is preferably ammonium perfluorooctanoate or ammonium perfluorononanoate.

Preferable examples of the fluorosurfactant include anionic fluorosurfactants such as a carboxylic surfactant and a sulfonic surfactant. Preferable examples of the anionic fluorosurfactants include carboxylic surfactants represented by the following formulas (i), (ii), (iii), (iv), (v), (vi), and (vii).

Examples of the anionic fluorosurfactant include a carboxylic surfactant represented by formula (I):

$$X\text{—}Rf^1COOM^1 \qquad (i)$$

wherein X is H, F, or Cl; $Rf^1$ is a C4 to C14, preferably C5 to C7 straight chain or branched fluoroalkylene group (e.g. a C7 straight chain or branched fluoroalkylene group), and most preferably a straight chain or branched perfluoroalkylene group; and $M^1$ represents a monovalent alkali metal, $NH_4$, or H.

Examples of the carboxylic surfactant represented by formula (I) include compounds such as $C_5F_{11}COOH$, $C_6F_{13}COOH$, and $C_7F_{15}COOH$, and salts of these compounds.

The examples of the anionic fluorosurfactant also include carboxylic surfactants represented by formula (ii):

$$X^1(CF_2)_p\text{—}O\text{—}CX^2X^3\text{—}(CF_2)_q\text{—}O\text{—}CX^4X^5\text{—}(CF_2)_r\text{—}COOM^1 \qquad (ii)$$

wherein $X^1$, $X^2$, $X^3$, $X^4$, and $X^5$ are the same as or different from each other, each representing H, F, or $CF_3$; $M^1$ represents a monovalent alkali metal, $NH_4$, or H; p represents 1 or 2; q represents 1 or 2; and r represents 0 or 1). Examples of carboxylic surfactants represented by formula (ii) include $CF_3OCF(CF_3)CF_2OCF(CF_3)COONH_4$, $CF_3CF_2OCF_2CF_2OCF_2COONH_4$, and $CF_3OCF_2CF_2CF_2OCHFCF_2COONH_4$.

The anionic fluorosurfactant may be a carboxylic surfactant represented by formula (iii):

$$X\text{—}(CF_2)_m\text{—}O\text{—}(CF(CF_3)CF_2O)_n\text{—}CF(CF_3)COOM^1 \qquad (iii)$$

wherein X is H, F, or Cl; m is an integer of 1 to 10 (e.g. 5); n is an integer of 0 to 5 (e.g. 1); and $M^1$ represents a monovalent alkali metal, $NH_4$, or H.

Preferable examples of the carboxylic surfactant represented by formula (iii) include compounds such as $CF_3\text{—}O\text{—}CF(CF_3)CF_2O\text{—}CF(CF_3)COOH$, and salts of these compounds.

The anionic fluorosurfactant may be a carboxylic surfactant represented by formula (iv):

$$X\text{—}(CF_2)_m\text{—}O\text{—}(CF(CF_3)CF_2O)_n\text{—}CHFCF_2COOM^1 \qquad (iv)$$

wherein X, m, n, and $M^1$ are the same as defined above.

The anionic fluorosurfactant may be a carboxylic surfactant represented by formula (v):

$$X\text{—}(CF_2)_m\text{—}O\text{—}(CF(CF_3)CF_2O)_n\text{—}CH_2CF_2COOM^1 \qquad (v)$$

wherein X, m, n, and $M^1$ are the same as defined above.

The examples of the anionic fluorosurfactant include carboxylic surfactants represented by formula (vi):

$$Rf^3OCF_2CF_2O(CF_2)_pCOOM^1 \qquad (vi)$$

wherein $Rf^3$ represents a partially or fully fluorine-substituted alkyl group; $M^1$ represents a monovalent alkali metal, $NH_4$, or H; and p represents 1 or 2. Here, $Rf^3$ is preferably a C1 to C3 alkyl group. Examples of the carboxylic surfactant represented by formula (vi) include $CF_3CF_2OCF_2CF_2OCF_2COONH_4$ and $CF_3CF_2OCF_2CF_2OCF_2COOH$.

The examples of the anionic fluorosurfactant also include carboxylic surfactants represented by formula (vii):

$$Rf^4OCHFCF_2COOM^1 \qquad (vii)$$

wherein $Rf^4$ is a partially or fully fluorine-substituted straight chain aliphatic group or a straight chain aliphatic group having at least one oxygen atom inserted therein; and $M^1$ represents a monovalent alkali metal, $NH_4$, or H. Here, $Rf^4$ is preferably a C1 to C3 aliphatic group. Examples of the carboxylic surfactant represented by formula (vii) include $CF_3OCF_2CF_2CF_2OCHFCF_2COONH_4$ and $CF_3OCF_2CF_2CF_2OCHFCF_2COOH$.

The polymerization in each of step (1) and step (2) can be performed at a polymerization temperature of 10° C. to 95° C. Too low a temperature may not allow the reaction to proceed, while too high a temperature may lead to a very large primary particle size. In the case of using a persulfate or water-soluble organic peroxide as the polymerization initiator, the polymerization is preferably performed at 60° C. to 90° C.

The polymerization in each of step (1) and step (2) can be performed at 0.3 to 3 MPa. Too low a pressure in the polymerization may decrease the reaction rate, while too high a pressure may excessively increase the reaction rate, making it difficult to control the temperature.

The polymerization in step (1) may include performing the reaction at a pressure of not higher than 0.5 MPa in the initial stage of the polymerization until a time point before the amount of tetrafluoroethylene used reaches 15 wt % or less of the total amount of tetrafluoroethylene for forming modified polytetrafluoroethylene particles, and thereafter maintaining the pressure at a value higher than 0.5 MPa.

The production method of the present invention may include a step of releasing the pressure between steps (1) and (2). The pressure release enables to remove substantially the entire amount of the comonomer (a) from the reaction system. Supplying TFE to the reaction system after the pressure release is considered to result in formation of a layer mainly containing tetrafluoroethylene units, on the outer surface of each particle formed before the pressure release.

The polymerization in each of step (1) and step (2) enables to obtain an aqueous dispersion in which modified PTFE particles (primary particles) are dispersed. The primary particles are crude dispersoids after the polymerization which have not been subjected to the post processes such as coagulation. The modified PTFE aqueous dispersion containing the modified PTFE particles is another aspect of the present invention.

Step (2) can be terminated by stopping the supply of TFE when the polymer concentration of the aqueous dispersion is 10 to 70 wt %, stopping the stirring, and releasing the remaining monomers out of the system.

Specifically, the method of producing the modified PTFE particles of the present invention may be performed, for example, at the time of polymerizing TFE in an aqueous medium in the presence of a surfactant at a temperature of 10° C. to 95° C. and a pressure of 0.3 to 3 MPa. Here, the production method includes adding the comonomer (a) to the reaction system in an initial stage of the polymerization reaction to polymerize the comonomer (a) together with TFE; adding the comonomer (b) to the reaction system after at least 75 wt % (preferably 90 wt %) of the TFE to be reacted is used; and performing the polymerization until all the TFE to be reacted is used so that the modified PTFE particles can be obtained.

A known point for achieving the desired properties in the above polymerization is that the purity of the components has to be especially cared. The amount of ionic impurities possibly increasing the ionic strength and the amount of soluble organic impurities possibly causing chain transfer or chain termination have to be minimized. It is important to use ultrahigh-purity water and ultrahigh-purity monomers in every case of such polymerization reaction.

The modified PTFE aqueous dispersion of the present invention preferably has a solids content of 10 to 70 wt %.

The modified PTFE aqueous dispersion of the present invention has excellent moldability and processability because the modified PTFE particles each have a characteristic core-shell structure. Examples of use of the modified PTFE aqueous dispersion of the present invention include impregnation performed by impregnating a porous medium such as a nonwoven fabric and a resin molded product in the aqueous dispersion, drying the medium and, preferably, firing the medium; and cast film formation performed by applying the aqueous dispersion to a substrate such as glass, drying the applied dispersion, immersing the resulting product in water as needed, and removing the substrate to obtain a thin film. Examples of application of the use include aqueous dispersion coating materials, binders for electrodes, water repellents for electrodes and drip inhibitors.

It is also possible to produce a modified PTFE fine powder by optionally adding a coagulation accelerator to the modified PTFE aqueous dispersion obtained from step (1) and step (2), vigorously stirring the dispersion to coagulate the modified PTFE particles, recovering the coagulum, and drying the coagulum. The modified PTFE fine powder consisting of the modified PTFE particles is yet another aspect of the present invention.

The modified PTFE particles constituting the modified PTFE fine powder of the present invention are what is called primary particles. The primary particles can also be referred to as crude polymer particles after polymerization, and can be aggregated through a process such as coagulation to form a modified PTFE fine powder (secondary particles).

The coagulation can be performed by a conventionally known method, and a compound such as a water-soluble organic compound and an inorganic salt of a basic compound may be optionally added as a coagulation accelerator. Here, before or during the coagulation, a pigment may be added for coloring, or a filler may be added to give conductivity or to improve the mechanical properties.

The drying can usually be performed at a temperature of 100° C. to 250° C. The drying is preferably performed for 5 to 24 hours. A high drying temperature increases the flowability of the powder, but may also increase the paste extrusion pressure of the modified PTFE fine powder to be obtained. Hence, the temperature setting needs to be especially cared.

The modified PTFE molded product of the present invention can be produced by molding and processing the modified PTFE particles or modified PTFE fine powder according to the present invention.

The molding and processing are not particularly limited, and may be performed by the paste extrusion method. The paste extrusion can be performed under the conditions that are appropriately changed according to the desired shape of the molded product, the application thereof, and the like. For example, the paste extrusion can be performed by mixing an extrusion aid with the particles or fine powder, aging the mixture for about 1 to 24 hours, performing preparatory molding at a pressure of 0.5 to 2.0 MPa, extruding the molded product at an extrusion pressure of 2 to 100 MPa, and firing the extruded product at 360° C. to 450° C.

The modified PTFE molded product of the present invention can be suitably used as a product required to have heat resistance and chemical resistance, such as a printed circuit board, a wire coating material, a tube, and a drip inhibitor, in the fields such as aircrafts, cars, medical equipment, and precision instruments. Among these, a wire coating material required to have properties such as core wire adhesion or a tube for medical use are preferable. A suitable example of the wire coating material may be a coating material for coating core wires such as copper wires. A coated wire having core wires and the wire coating material is preferably a wire such as a heat resistant wire and a coaxial cable.

EXAMPLES

Hereinafter, the present invention will be described in more detail based on the examples which, however, are not intended to limit the scope of the present invention.

The numerical values in the examples were determined by the following methods.
(1) Polymer Concentration An amount of 10 g of the modified PTFE aqueous dispersion was extracted on a petri dish. The petri dish was heated at 150° C. for about three hours, and then the solids content was weighed so that the polymer concentration, which is the ratio of the mass of the solids content to the mass of the modified PTFE aqueous dispersion, was calculated.
(2) Average Primary Particle Size The modified PTFE aqueous dispersion was adjusted to have a solids concentration of 0.15 wt %, and was then put into a cell. The transmittance of incident light at 550 nm was measured. Separately, the number average primary particle size of the dispersion was calculated by measuring diameters in a fixed direction on a transmission electron photomicrograph. A working curve was drawn which showed the correlation between the transmittance and the number average primary particle size. Based on the working curve and the transmittance of the sample, the average primary particle size was determined.
(3) Core Ratio After the polymerization started, the core ratio was calculated as a ratio of the amount of monomers used before the addition of a modifying monomer in the shell to the amount of monomers used for the entire polymerization reaction.
(4) Modified Amount in Core and Shell The amount of 1,1,3,3,3-pentafluoro-1-propylene ($CF_3CH$=$CF_2$) (wt %) was determined by multiplying a ratio of the absorption of an infrared absorption band at 983 $cm^{-1}$ to the absorption at 935 $cm^{-1}$ by a coefficient of 0.3.

The amount of (perfluoro-n-hexyl)ethylene (PFHE) was calculated from the following formula based on a chart obtained by analysis of a melted PTFE by 300 MHz $^{19}$F-NMR spectroscopy.

$$\text{Tetrafluoroethylene content} = \{A - (10B/3)\}/(A-2B)$$

$$\text{PFHE content} = (4B/3)/(A-2B)$$

In consideration of the chemical shift of $CF_2$ in the main chain of the PTFE at −120 ppm, A and B were set to the following integral values.
A=integral value of the range of −160 to −85 ppm
B=integral value of the range of −85 to −80 ppm The amount of the modifying monomers in each of the core and the shell in Table 2 shows the ratio of the modifying monomers to the entire particles.
(5) Standard Specific Gravity [SSG]

The standard specific gravity was determined by the water displacement method in accordance with ASTM D4895-89.
(6) Extrusion Pressure The extrusion pressure at a reduction ratio of 1500 was measured using an extruder in accordance with ASTM D4895. First, 60.00 g of a modified PTFE powder and 12.30 g of a hydrocarbon oil (trade name: Isopar G, product of Exxon Chemical Company) as an extrusion aid were mixed in a glass bottle, and the mixture was aged for one hour at room temperature (25±2° C.). Next, the cylinder of the extruder was filled with the above mixture, and maintained at room temperature for one minute. Then, a pressure of 5.7 MPa was applied to the piston inserted in the cylinder, and the mixture was immediately extruded from the orifice at a ram speed of 20 mm/min at room temperature. The load (N) at the time that the pressure was brought into the equilibrium state by the extrusion operation was divided by the cylinder cross-sectional area, and the resulting value was determined as the extrusion pressure (MPa).

(7) Green Elongation of Extruded Product

A bead obtained by the extrusion was dried at 70° C. for 24 hours, and then dried at 210° C. for 15 minutes. Five 10-cm beads were cut from the portions where the extrusion was stable. The beads were left to stand at room temperature (25±2° C.) for 24 hours, and the test was performed using a tensile testing machine (Tensilon universal testing machine RTC1250A, product of Shimadzu Corporation). In the test, the chuck distance was adjusted to 40 mm, and the sample was gripped by the chucks on the top and the bottom. The top chuck was raised at a rate of 20 mm/min and stopped when the sample was broken. The green elongation was calculated from the following formula based on the position of the top chuck.

Green elongation (%)=(distance at break (mm)/40 mm)×100

(8) Thermal Stability Index [TII]

A sample was produced in the same manner as that for SSG measurement, and fired at 380° C. for five hours. The estimated specific gravity (ESG) of the sample was measured, and the thermal stability index was determined from the following formula.

Thermal stability index=(ESG−SSG)×1000

(9) Green Strength

The strength per cross-sectional area (MPa/cm$^2$) of the sample used in the measurement of the above item (7) was determined.

(10) Extrusion Stability

With a chart of the extrusion pressures obtained in the measurement of the above item (7), the difference between the maximum pressure (A) and the stable pressure (B) was determined. A sample having a smaller value of the difference, corresponding to better extrusion stability, can give a stable molded product.

(11) Extruded Product Appearance

The appearance of the bead used in the measurement of the above item (7) was ranked based on the following criteria.
A: No damage is observed on the surface
B: Damages is observed on the surface

(12) Electrical Properties—Dielectric Loss Tangent, Relative Dielectric Constant The powder was compression-molded into a pillar shape, and a 0.5-mm-thick sheet cut out from the pillar was fired at 380° C. for five minutes, and allowed to be cooled to room temperature at a cooling rate of 60° C./hr to obtain a film.

The resonant frequency of the film and the change in the Q value were measured using a cavity resonator of a network analyzer (HO8510C, product of Hewlett Packard), and the dielectric loss tangent (tan δ) at 12 GHz was calculated from the following formula.

$$\tan \delta = (1/Q_u) \times \{1+(W_2/W_1)\} - (P_c/\omega W_1)$$

The symbols in the formula are as shown below.

Also, the relative dielectric constant ($\in_r$) at 12 GHz was calculated from the following formula.

The symbols in the formula are as shown below.

$$\varepsilon_r = \left(\frac{c}{\pi \times L - F_0}\right)^2 \times \left\{X^2 - Y^2\left(\frac{L}{2M}\right)^2\right\} + 1$$

$$X \tan X = (L/2M) \, Y \cos Y$$

$$X = \frac{L}{2}\sqrt{\varepsilon_r \times k_0^2 - k_r^2}$$

$$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-Id/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

$$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Note that the symbols in these formulas are as follows.
D: Cavity resonator diameter (mm)
M: Cavity resonator one-side length (mm)
L: Sample length (mm)
c: Velocity of light (m/s)
Id: Attenuation (dB)
$F_0$: Resonant frequency (Hz)
$F_1$: Upper frequency attenuated by 3 dB from resonance point (Hz)
$F_2$: Lower frequency attenuated by 3 dB from resonance point (Hz)
$\in_0$: Vacuum dielectric constant (H/m)
$\in_r$: Relative dielectric constant of sample
$\mu_0$: Vacuum magnetic permeability (H/m)
Rs: Effective surface resistance in view of surface roughness of conductor cavity (Ω)
$J_0$: −0.402759
$J_1$: 3.83171

Example 1

A 6000-ml horizontal stainless steel autoclave having a stirrer equipped with four sets of four blades (16 blades in total) configured to rotate in the length direction of the autoclave was charged with 3600 ml of deionized water, 180 g of paraffin wax, and ammonium perfluorooctanoate (PFOA) in an amount giving a 800-ppm solution in deionized water. Evacuation and nitrogen replacement for the autoclave were performed at 65° C. three times, and then TFE replacement was performed twice.

Next, the internal temperature of the autoclave was raised to 80° C. while the stirrer was rotated at 216 rpm. TFE monomers were further supplied until the pressure was increased to 0.15 MPa, and then 0.66 g of (perfluoro-n-hexyl) ethylene (PFHE) was added. An amount of 0.018 g (5 ppm in deionized water) of ammonium persulfate (APS) dissolved in deionized water, and 0.288 g (80 ppm in deionized water) of disuccinic acid peroxide (DSP) were added to initiate the polymerization reaction at a polymerization pressure of 0.3 MPa. TFE was not supplied during the polymerization, and the mixture was left to stand for 40 minutes.

Thereafter, the stirring was stopped, TFE was supplied to the autoclave, and the pressure was set to 1.2 MPa so that the polymerization reaction was started again. The internal pressure of the autoclave was maintained at 1.2 MPa, the stirring was stopped when 1.53 kg of TFE was reacted after the start of the polymerization, and the internal pressure of the autoclave was decreased to 0.05 MPa. These processes are referred to as a core reaction.

Then, 0.93 g of 1,1,3,3,3-pentafluoro-1-propylene ($CF_3CH=CF_2$) and 0.5 g of methanol were charged into the autoclave, and TFE was further supplied to raise the pressure to 1.2 MPa. An amount of 0.17 kg of TFE was further added while the stirrer was rotated at 145 rpm. The supply of the TFE monomers and the stirring were stopped when the total amount of TFE used in the reaction reached 1.7 kg. These processes are referred to as a shell reaction.

Thereafter, TFE in the autoclave was recovered, and the internal pressure was decreased to 0 to 0.05 MPa. Then, the autoclave was purged with $N_2$ twice. The total polymerization time was 312 minutes. Table 1 shows the polymerization conditions in the present example.

The resulting dispersion was discharged to be cooled, and the supernatant paraffin wax was removed, so that a dispersion having a primary particle size of 224 nm and a polymer concentration (solids concentration) of 33.0 wt % was obtained. The dispersion was diluted to have a solids concentration of 15 wt %, maintained at a temperature of 30° C., and vigorously stirred until the particles aggregated. The stirring was continued for one minute after the aggregation occurred and the powder started to float. The coagulum was dried at 155° C. for 18 hours, and thereby a modified PTFE fine powder was obtained. The modified PTFE fine powder had an SSG of 2.153, contained 0.011 wt % of PFHE, contained 0.014 wt % of 1,1,3,3,3-pentafluoro-1-propylene, and had a core ratio of 90 wt %, and had an extrusion pressure of 51.3 MPa at an RR of 1500. The extruded product had a green elongation of 223% at an RR of 1500. Also, the thermal stability index, green strength, extrusion stability, extruded product appearance, and electrical properties (relative dielectric constant, tan δ) were evaluated.

Table 2 or 3 shows the results.

Example 2

A dispersion of modified PTFE particles was obtained in the same manner as that in Example 1, except that $CF_3$—O—$CF(CF_3)CF_2O$—$CF(CF_3)COONH_4$ (PMPA) was added instead of ammonium perfluorooctanoate, the amounts of PFHE, 1,1,3,3,3-pentafluoro-1-propylene ($CF_3CH=CF_2$), and methanol were respectively changed to 0.99 g, 0.47 g, and 0.25 g. The resulting dispersion had a primary particle size of the modified PTFE particles of 227 nm, and a solids concentration of 31.9 wt %. Table 1 shows the polymerization conditions in the present example.

From the dispersion, a modified PTFE fine powder was obtained in the same manner as that in Example 1. The modified PTFE fine powder had an SSG of 2.146, contained 0.015 wt % of PFHE, contained 0.010 wt % of 1,1,3,3,3-pentafluoro-1-propylene, and had a core ratio of 90 wt %, and had an extrusion pressure of 54.8 MPa at an RR of 1500. The extruded product had a green elongation of 239% at an RR of 1500. Also, the thermal stability index, green strength, extrusion stability, and extruded product appearance were evaluated.

Table 2 or 3 shows the results.

Example 3

A dispersion of modified PTFE particles was obtained in the same manner as that in Example 2, except that the polymerization pressure in the core reaction was 1.5 MPa, and the amount of 1,1,3,3,3-pentafluoro-1-propylene, and methanol were respectively changed to 0.93 g, and 0.50 g. The resulting dispersion had a primary particle size of the modified PTFE particles of 226 nm, and a solids concentration of 32.1 wt %. Table 1 shows the polymerization conditions in the present example.

From the dispersion, a modified PTFE fine powder was obtained in the same manner as that in Example 1. The modified PTFE fine powder had an SSG of 2.149, contained 0.012 wt % of PFHE, contained 0.024 wt % of 1,1,3,3,3-pentafluoro-1-propylene, and had a core ratio of 90 wt %, and had an extrusion pressure of 38.3 MPa at an RR of 1500. The extruded product had a green elongation of 190% at an RR of 1500. Also, the thermal stability index, green strength, extrusion stability, and extruded product appearance were evaluated.

Table 2 or 3 shows the results.

Example 4

A dispersion of modified PTFE particles was obtained in the same manner as in Example 3, except that the polymerization pressure in the core reaction was 1.2 MPa, and the amount of 1,1,3,3,3-pentafluoro-1-propylene, and methanol were respectively changed to 0.23 g, and 0.13 g. The resulting dispersion had a primary particle size of the modified PTFE particles of 226 nm, and a solids concentration of 31.8 wt %. Table 1 shows the polymerization conditions in the present example.

From the dispersion, a modified PTFE fine powder was obtained in the same manner as that in Example 3. The modified PTFE fine powder had an SSG of 2.144, contained 0.014 wt % of PFHE, contained 0.004 wt % of 1,1,3,3,3-pentafluoro-1-propylene, and had a core ratio of 90 wt %, and had an extrusion pressure of 63.9 MPa at an RR of 1500. The extruded product had a green elongation of 201% at an RR of 1500. Also, the thermal stability index, green strength, extrusion stability, and extruded product appearance were evaluated.

Table 2 or 3 shows the results.

TABLE 1

| | Surfactant Species | DSP (mg) | APS (mg) | Reaction temperature (°C.) | Reaction pressure (MPa) Core reaction At the start of reaction | Reaction pressure (MPa) Core reaction After 40 min | Shell reaction | Modifying monomer in core Species | Modifying monomer in core Amount (g) | Modifying monomer in shell Species | Modifying monomer in shell Amount (g) | Chain transfer agent Species | Chain transfer agent Amount (g) |
|---|---|---|---|---|---|---|---|---|---|---|---|---|---|
| Example 1 | PFOA | 288 | 18 | 80 | 0.3 | 1.2 | 1.2 | PFHE | 0.66 | $CF_3CH=CF_2$ | 0.93 | MeOH | 0.50 |
| Example 2 | PMPA | 288 | 18 | 80 | 0.3 | 1.2 | 1.2 | PFHE | 0.99 | $CF_3CH=CF_2$ | 0.47 | MeOH | 0.25 |
| Example 3 | PMPA | 288 | 18 | 80 | 0.3 | 1.5 | 1.2 | PFHE | 0.99 | $CF_3CH=CF_2$ | 0.93 | MeOH | 0.50 |
| Example 4 | PMPA | 288 | 18 | 80 | 0.3 | 1.2 | 1.2 | PFHE | 0.99 | $CF_3CH=CF_2$ | 0.23 | MeOH | 0.13 |

TABLE 2

| | Core (A) Species | Core (A) Amount (wt %) | Shell (B) Species | Shell (B) Amount (wt %) | A + B (wt %) | Standard specific gravity [SSG] | Thermal stability index [TII] | Polymer concentration (wt %) |
|---|---|---|---|---|---|---|---|---|
| Example 1 | PFHE | 0.011 | $CF_3CH=CF_2$ | 0.014 | 0.025 | 2.153 | 8 | 33.0 |
| Example 2 | PFHE | 0.015 | $CF_3CH=CF_2$ | 0.010 | 0.025 | 2.146 | 8 | 31.9 |
| Example 3 | PFHE | 0.012 | $CF_3CH=CF_2$ | 0.024 | 0.036 | 2.149 | 5 | 32.1 |
| Example 4 | PFHE | 0.014 | $CF_3CH=CF_2$ | 0.004 | 0.018 | 2.144 | 7 | 31.8 |

TABLE 3

| | Moldability and processability | | | | | Electrical property | |
|---|---|---|---|---|---|---|---|
| | Extrusion pressure (MPa) | Green elongation (%) | Green strength (MPa/cm²) | Extrusion stability (MPa) | Extruded product appearance | Relative dielectric constant (12 GHz) | tan δ (12 GHz) |
| Example 1 | 51.3 | 223 | 2.8 | 4.9 | A | 2.088 | 2.39 |
| Example 2 | 54.8 | 239 | 2.8 | 7.0 | A | — | — |
| Example 3 | 38.3 | 190 | 2.1 | 6.5 | A | — | — |
| Example 4 | 63.9 | 201 | 3.2 | 8.0 | B | — | — |

Since the modified PTFE particles of the present invention have the above structure, the particles have excellent moldability and processability. Hence, the particles can be processed into a molded product having excellent properties such as transparency, heat resistance, and chemical resistance.

The modified PTFE molded product of the present invention has the above structure, and thus has excellent properties such as transparency, heat resistance, and chemical resistance. The modified PTFE molded product can be suitably used as, for example, a wire coating material or a tube used in fields such as aircrafts, cars, medical equipment, and precision instruments.

The invention claimed is:

1. Modified polytetrafluoroethylene particles, each comprising a core-shell structure that includes a particle core and a particle shell,
   the particle core comprising repeating units of tetrafluoroethylene and a comonomer (a),
   the particle shell comprising repeating units of tetrafluoroethylene and a comonomer (b),
   the comonomer (a) being a (perfluoroalkyl)ethylene represented by the following formula (I):

$$CH_2=CH-Rf \qquad (I)$$

wherein Rf represents a $C_1$ to $C_{10}$ perfluoroalkyl group,
   the comonomer (b) being at least one monomer selected from the group consisting of 1,1,3,3,3-pentafluoro-1-propylene and 1,2,3,3,3-pentafluoro-1-propylene,
   wherein the repeating units of the comonomers (b) in the particle shells constitute 0.001 to less than 0.050 wt % of the total amount of the particles.

2. The modified polytetrafluoroethylene particles according to claim 1,
   wherein the particle cores constitute 75 to 95 wt % of the total amount of the particles, and the particle shells constitute 5 to 25 wt % of the total amount of the particles.

3. The modified polytetrafluoroethylene particles according to claim 1,
   wherein the repeating units of the comonomers (a) in the particle cores constitute 0.010 to 0.030 wt % of the total amount of the particles.

4. The modified polytetrafluoroethylene particles according to claim 1,
   wherein the repeating units of the comonomers (a) and the comonomers (b) together constitute 0.011 to 0.060 wt % of the total amount of the particles.

5. The modified polytetrafluoroethylene particles according to claim 1,
   wherein each of the comonomers (a) is (perfluorohexyl)ethylene.

6. The modified polytetrafluoroethylene particles according to claim 1,
wherein the particles have a standard specific gravity of 2.140 to 2.160.

7. A modified polytetrafluoroethylene aqueous dispersion comprising the modified polytetrafluoroethylene particles according to claim 1.

8. A modified polytetrafluoroethylene fine powder consisting of the modified polytetrafluoroethylene particles according to claim 1.

9. A modified polytetrafluoroethylene molded product made of the modified polytetrafluoroethylene particles according to claim 1.

10. A method for producing the modified polytetrafluoroethylene particles according to claim 1, comprising the steps of
   (1) polymerizing tetrafluoroethylene and the comonomer (a), and
   (2) polymerizing tetrafluoroethylene and the comonomer (b) after step (1).

11. The modified polytetrafluoroethylene particles according to claim 1,
wherein the repeating units of the comonomers (b) in the particle shells constitute 0.001 to 0.030 wt % of the total amount of the particles.

* * * * *